Oct. 19, 1948.  L. BASSANI ET AL  2,451,902
PROCESS FOR COLOR CINEMATOGRAPHY
ON LENTICULAR FILMS
Filed May 10, 1945
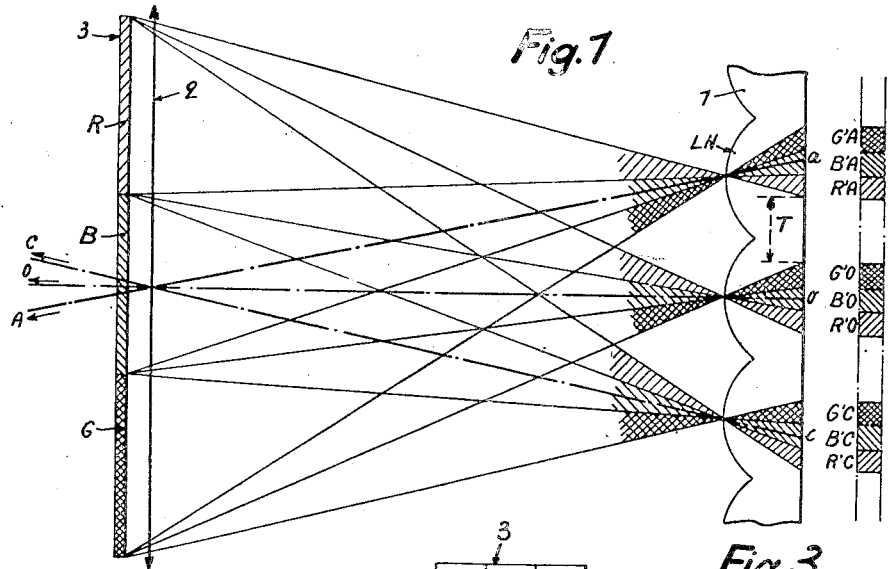
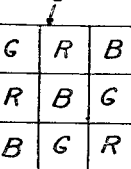
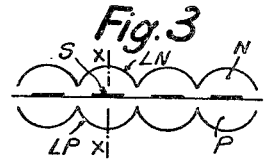
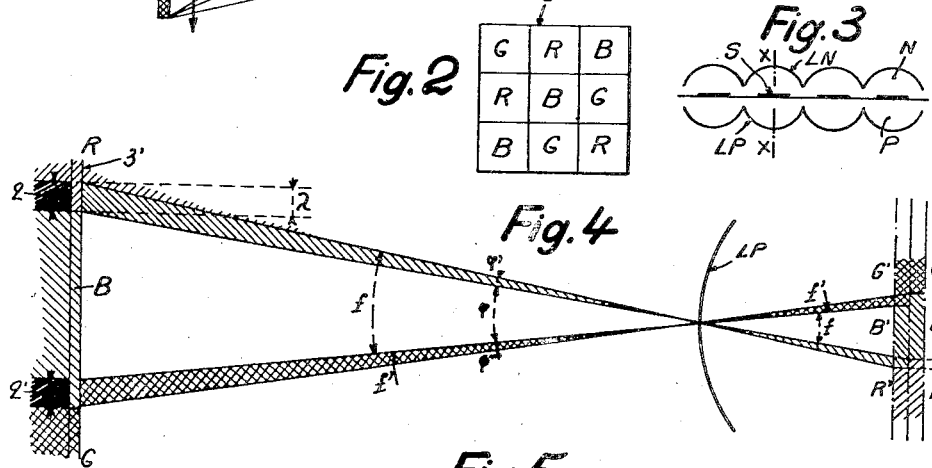
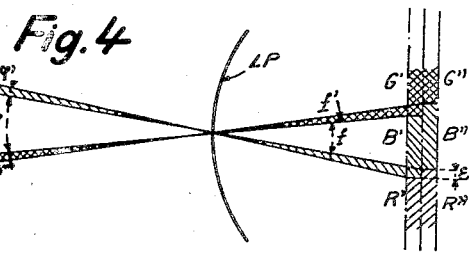
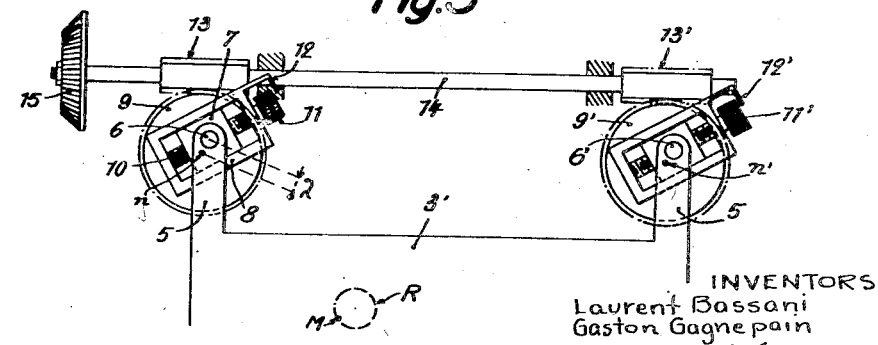
INVENTORS
Laurent Bassani
Gaston Gagnepain
By
their ATTY.

Patented Oct. 19, 1948

2,451,902

UNITED STATES PATENT OFFICE 2,451,902

PROCESS FOR COLOR CINEMATOGRAPHY ON LENTICULAR FILMS

Laurent Bassani and Gaston Gagnepain, Paris, France

Application May 10, 1945, Serial No. 592,956
In France December 22, 1944

3 Claims. (Cl. 88—16.4)

The attempts made heretofore in order to print copies by contact on positive lenticular films from lenticular negative films have not proved satisfactory. This is due to the material impossibility of accurately registering the minute lenticulations of both films, so that the chromo-selected image corresponding to a lenticulation of the negative (that is the image of the coloured filter used for in the camera and given by this particular lenticulation) should be printed on the positive film exactly in the same relative position with respect to the lenticulation of the positive film. Even if it were possible to provide for the most perfect registration for two correspondent lenticulations of the negative and positive films, and if the pitch and profile of the lenticulation were absolutely identical for both films at the moment of their manufacture, the difference between the two films in tension, chemical composition, hygrometric conditions, etc., will be sufficient to bring about differences in pitches at the time of printing copies and therefore shift the chromo-selected image of the positive out of their correct position with respect to the lenticulations thereof, thus destroying the quality of the projected coloured image.

An attempt to obviate this defect would consist in correcting this defect due to the discordance $\epsilon$ of the image of the filter used in the camera with respect to the lenticulations of the positive by shifting the coloured filter used at the projection by a distance $\lambda$ proportional to $\epsilon$ but of contrary direction. But as the amount of deviation $\epsilon$ varies all along the positive film, $\lambda$ would have to be constantly modified.

Now, applicants found that it is possible to attenuate to a certain extent the defects of the printed copy by giving to the filter used at the projection an oscillatory movement, the amplitude $\lambda_0$ of which represents the average displacement which should be given to the projection filter in order to compensate for the average deviation of the elementary images with reference to the lenticulations of the positive, the oscillation period being equal to the time an image field of the film remains stationary behind the projection window.

It will be appreciated that, among the various positions that the projection filter will occupy in the course of an oscillation period, at least one will correspond with the correct position, compensating for the deviation $\epsilon$. Generally, the filter will have to pass through this position twice (once in going and once in returning) and the result obtained will be intermediate between the optimum one and the worst one (no compensating offsetting of the projection filter for a deviation $\epsilon$ of the positive images).

In practice, for reasons of symmetry or uniformity of the images projected on the screen, the oscillatory movement should not be a reciprocating rectilinear movement, but a movement of circular translation. This condition is essential when the lenticulations of the film form a crosshatching respectively parallel and perpendicular to the axis of the film and when the filter itself forms a crosshatching of differently coloured zones.

The result can be considerably improved by imparting to the filter of the camera, at the view taking, a movement of circular translation with an amplitude $\delta$, producing a circular translation of the elementary images of the negative around their medium position with an amplitude distinctly larger than the average deviation $\epsilon_0$, but of course smaller than such a one that would provoke an entire substitution of the image of a filter element for the image of another filter element, and by imparting to the projection filter an identical circular translation movement (taking in consideration the scale of the projection with respect to the scale of the view taking in the camera).

In this manner, the deviations $\epsilon$ of the positive images from their accurate positions, which lead to the imperfections of the copy, are small in comparison with the systematical deviations brought about by the circular translation of the camera filter, whereby the effect of these deviations $\epsilon$ practically disappears at the restitution produced by the circular translation of the filter used at the projection, and the result becomes comparable to what could be obtained with a lenticular negative film transformed into a positive one by a photographic treatment of inversion.

Another advantage of the circular translation of the camera filter is that the whole field of a lenticulation is swept by the image of the camera filter, so that the whole of said field participates in the chromatic selection, whereas, in the ordinary method of taking views on lenticular films, the marginal parts of said field do not receive any light and form on the positive opaque zones, which reduce the optical efficiency of the projection.

It will be noted that the circular translation of the camera filter causes between the adjacent areas of elementary chromatic selection which give an exact reproduction of the coloured elements of the filter, intermediate areas where the selection is not rigorous, as they have been successively swept by light rays which have passed through differently coloured elements of the filter. But, during the projection, the circular translation of the projection filter produces an actual exploration of the positive film, which, because of the identic movements of both filters (except for the scales of the amplitudes), compensates for the effect of the circular translation of the camera filter and restores a correct projected image.

In practice, the best result will be usually obtained experimentally by regulating the amplitude and the phase of the translation of the projection filter, until the result appearing on the projection screen will be the best.

The invention also covers the apparatus for carrying out the above mentioned process and the films obtained thereby.

The mechanism for imparting to the filters the circular translation movement is preferably constituted as described in United States Patent No. 1,575,408.

Further characteristics of the invention will be apparent from the following description, with reference to the annexed drawing which shows, by way of example, an embodiment of the invention and in which:

Fig. 1 is a diagrammatical view illustrating the exposure of a lenticular film;

Fig. 2 shows, on a smaller scale, a filter to be used in the camera and the projector;

Fig. 3 diagrammatically illustrates the operation of printing on a positive film by contact;

Fig. 4 shows the effect of the deviation of the image of the filter given by a lenticular element, and Fig. 5 diagrammatically shows a control device for the circular translation movement of the filter.

Referring to the drawing, $l$ denotes a lenticular film provided for instance with cylindrical ridges, 2 a camera lens, and 3 a coloured filter built up of a certain number of transparent zones of different colours such as R—B—G (for instance red, blue, and green).

Without the lenticulations, lens 2 would give an image $a$ from point A of the subject, an image $o$ from point O and an image $c$ from point C. But each lenticulation of the film produces on the emulsion an image of filter 3, so that the image $a$ of point A is constituted in fact by a chromo-selection G'A—B'A—R'A corresponding to the zones R—B—G of filter 3. In the same way, the image $o$ is constituted by a chromo-selection G'O—B'O—R'O and the image $c$ by a chromo-selection G'C—B'C—R'C. For the projection, the lens of the projector must be associated with a filter similar to camera filter 3 and it will be understood that, if the relation of filter 3 with respect to film $l$ is the same at the projection as at the taking of the view, the lenticulations of the film $l$ and the lens of the projector will cooperate to restitute the coloured image of the subject, as is well known in the art.

However, in order to obtain this result, it is obviously necessary that the chromo-selection of each lenticulation of the projected positive film (that is the image C'A—B'A—R'A of filter 3, given by the corresponding lenticulation) shall have a rigorously identic position as the negative chromo-selection relatively to the corresponding lenticulation of the negative film.

This result is necessarily obtained when the positive film is constituted by the negative film after an inversion treatment. However, when the positive film is produced from a negative film by contact printing (Fig. 3), the above mentioned condition cannot be practically fulfilled.

Contact printing, as shown in Fig. 3, is obtained by positioning the developed negative film N in contact with the unexposed positive film P, the emulsion coatings being in contact, and in order that the chromo-selection S should occupy in the positive film P the same relative position with respect to the lenticulation LP, as the chromo-selection in the negative film with respect to the lenticulation LN, it is necessary that:

1. All the lenticulations LN and LP should be exactly identical and have the same pitch;
2. The optical axis of each lenticulation LP should exactly coincide with the optical axis of the opposite lenticulation LN.

As above explained, even admitting that the registering of the two films should be possible in a perfect form for a pair of corresponding positive and negative lenticulations, i. e. that the optical axes of both these lenticulations could be brought into perfect coincidence along X—X, the differences in tension between the two films, the variations in their chemical composition, hygrometric condition, will be such that the same condition will not be fulfilled for the other pairs of lenticulations LN—LP.

Fig. 4 shows the effect of a deviation $\epsilon$ between the actual position of the image G'B'R' of filter GBR relatively to the positive lenticulation LP and the image G"B"R" which would have been obtained, had the positive film been produced by inversion of the negative, instead of being produced by contact printing.

The parts G" B" R" of the image on the correct film are intended to project respectively green, blue and red images on the screen, and at the projection they respectively cover the green, blue and red filters. If a defective copy is used, the images G', B', R' which are for instance shifted downwardly with respect to images G" B" R" will be substituted therefor. Considering for instance the image B', it will be seen on the drawing that the beam of white light $f'$ which passes through the lower part of image G' and should normally project a green color will pass through the blue filter and will therefore project a blue color. Similarly, the beam of white light $f$ which passes through the lower part of image B' and should normally project a blue color will pass through the red filter and will thus project a red color on the screen. The whole image on the screen, corresponding to the lenticulation considered will thus be formed partly in correct colors and partly in wrong colors, so that the whole projection will be defective so far as a true color reproduction is concerned.

It will be understood that, in order to establish the correct conditions of the restitution of the exact image, it would be sufficient to displace the projection screen 3' with respect to the theoretical position shown in the drawing, by a distance $\lambda$ proportional to $\epsilon$, but of reverse direction. However, as already explained, the deviation $\epsilon$ varies all along the positive film, so that the correction $\lambda$ cannot be constant during the whole time of a projection.

As previously mentioned, the invention consists in giving to the projection filter 3' an oscillatory movement, whose amplitude $\lambda_0$ represents the average offset or displacement to be given to the projection filter in order to compensate for the deviation $\epsilon_0$ of the elementary images G'B'R' with respect to the positive lenticulation LP, the oscillation peiod being equal to the time an image field remains behind the projection window.

As a rule, and more specifically when the filters 3, 3' are crosshatched as shown on Fig. 2, the oscillation movement to be imparted to the projection filter will be a circular translation, which can for instance be achieved by a mechanism such as that shown diagrammatically on Fig. 5, where filter 3' has two lugs 5 pivoted about a pivot pin 6, supported by a nut 7, guided in a slide 8, carried by a helical gear, the centre of which is shown at $m$. Nut 7 is engaged by a micrometric screw 10, the head of which is milled and provided with a graduated scale cooperating with an index 12. The helical gear 9 meshes for instance with a worm 13 keyed upon a shaft 14, controlled by a pinion 15 actuated at a constant speed by any suitable motor. On shaft 14 is keyed a second worm gear 13' in mesh with a helical gear 9' on which is mounted a device similar to the preceding one. It will be seen that, by turning the knobs 11, 11' by equal angles, relatively to index 12, 12', the eccentricity of the axes 6, 6', can be varied at will with respect to the centers $n$, $n'$ of pinions 9, 9'. The rotation of shaft 14 thus produces a circular translation movement of screen 3', each point of which, such as M, describing a circle R whose radius is $\lambda_0$.

As above explained, the result can still be highly improved by imparting to the camera filter 3 a circular translation movement with an amplitude $\delta$, producing a circular translation of the elementary images of the negative G'B'R' around their medium position, with an amplitude distinctly larger than the average deviation $\epsilon_0$, but smaller than the amplitude which would bring about a complete substiution of the image of a filter element for the image of another filter element for instance the complete substitution of the image B' for the image C'.

This circular translation of the camera screen 3 must be associated with a circular translation of the projection screen 3', the amplitude of these circular translations must be identical for both screens taking into account the scales of the images in the camera and on the projection screen. For carrying out this process, the camera screen 3 and the projection screen 3' will be controlled by a mechanism of the type shown in Fig. 5, or still better by a pantograph mechanism such as described in the prior specification above referred to.

The circular translation of the camera filter affords a further advantage: as shown in Fig. 1, the marginal sections T of each image field of a lenticulation LN do not receive any light and therefore produce on the positive opaque areas which reduce the optical efficiency of the projection. In the process according to this invention, the circular translation of filter 3 produces a sweeping of the whole image field corresponding to each lenticulation LN, which considerably reduces or eliminates the importance of the zones T which do not receive any light at the time when the view is taken.

As above explained, the partial overlap of the images such as G'B'R', as a result of such sweeping of each elementary field by the corresponding image of the filter, produces between the areas of elementary chromatic selection such as G'—B'—R', intermediate areas where the selection is not quite true, since they are successively swept by luminous rays which passed through differently coloured elements of filter 3. However, the circular translation of projection filter 3' causes an exploration of the positive film P which, due to the identity of the movements of both filters 3, 3' reduced to the proper scale restitutes the correct projected image.

In practice, in order to obtain the desired result, the operator will, during the projection, turn knobs 11, 11' until the effect obtained on the projection screen will be satisfactory.

Obviously, the invention is not limited to the above described embodiment, which is given solely by way of example.

Having now described our invention what we claim as new and desire to secure by Letters Patent is:

1. A method of color cinematography which comprises projecting on a screen through an objective and a color filter elementary color selective images which have been formed on a lenticular film and are adapted to occupy on said film variable positions from one particular film to the other with respect to the corresponding lenticulation, the light beam passing directly from the lenticular film to the color filter, and imparting to the filter an oscillatory movement whose amplitude is less than the amplitude corresponding to a displacement of an image on the lenticular film equal to the smallest cross-dimension of a lenticulation and proportional to the average displacement of the elementary images with respect to the corresponding lenticulation.

2. A method as claimed in claim 1, in which the said oscillatory movemet is a movement of circular translation.

3. A method according to claim 1, in which the said elementary color selective images have been formed on the film by printing from a negative lenticular film.

LAURENT BASSANI.
GASTON GAGNEPAIN.

REFERENCES CITED

The following references are of record in the file of this patent:

UNITED STATES PATENTS

| Number | Name | Date |
| --- | --- | --- |
| 1,575,408 | Bassani | Mar. 2, 1926 |
| 1,717,404 | Powrie | June 8, 1929 |
| 2,016,270 | Arni et al. | Oct. 8, 1935 |
| 2,203,651 | Capstaff | June 4, 1940 |
| 2,352,864 | Saint Genies | June 4, 1944 |